Jan. 29, 1952     E. A. BRAUN     2,583,993

APPARATUS FOR ARTIFICIAL DEVELOPMENT OF GERM ORGANISMS

Filed Dec. 31, 1946

E. A. BRAUN
*INVENTOR.*

BY *Robert Meyer*
*attorney*

Patented Jan. 29, 1952

2,583,993

UNITED STATES PATENT OFFICE 2,583,993

APPARATUS FOR ARTIFICIAL DEVELOPMENT OF GERM ORGANISMS

Emil A. Braun, Bloomfield, N. J.

Application December 31, 1946, Serial No. 719,492

5 Claims. (Cl. 219—35)

This invention relates to an apparatus for artificially developing germ organisms, i. e., an apparatus which will artificially develop the formative protoplasm of an egg, seed or the like.

An object of the present invention is to provide an apparatus for artificially germinating eggs, seeds or the like, which is relatively small, portable, and is provided with a transparent window so that the germination of the objects therein may be watched, thereby providing an apparatus of this type particularly adapted for educational purposes or for amusement, and by means of which the growing of seeds or the hatching of eggs may be watched and the process of their germination visibly taught to observers.

Another object of the present invention is to provide an apparatus for artificially developing germ organisms which utilizes the heat and light of an electric bulb or bulbs for providing the required heat and embodies a white or light colored light reflecting lining which also serves to insulate the interior of the apparatus and further to provide temperature variance operated means for controlling the energizing and de-energizing of the light bulb or bulbs for maintaining within the apparatus the proper degree of heat required to cause germination of the germ organisms in the apparatus.

A further object of the invention is to provide an apparatus as specified which is attractive in appearance and light in weight and may be placed on a stand or table in a classroom, living room of a home or other convenient place so that close-up views of the hatching of a chick, a duckling or other fowl or growing of seeds may be provided.

Further objects of the invention are to provide means for protecting the sensitive temperature operated thermo-switch from contact or injury of small chicks when the apparatus is employed for hatching eggs; to provide a runway which may be easily attached to and detached from the apparatus proper to permit the chicks to run in the open when they reach sufficient size for doing so and to provide a novel arrangement whereby the carrying handle of the device serves as means for holding the light and heat deflecting shield in position.

With these and other objects in view, as may appear from the accompanying specification, the invention consists of various features of construction and combination of parts, which will be first described in connection with the accompanying drawings, showing apparatus for artificial development of germ organisms of a preferred form embodying the invention, and the features forming the invention will be specifically pointed out in the claims.

Figure 1:
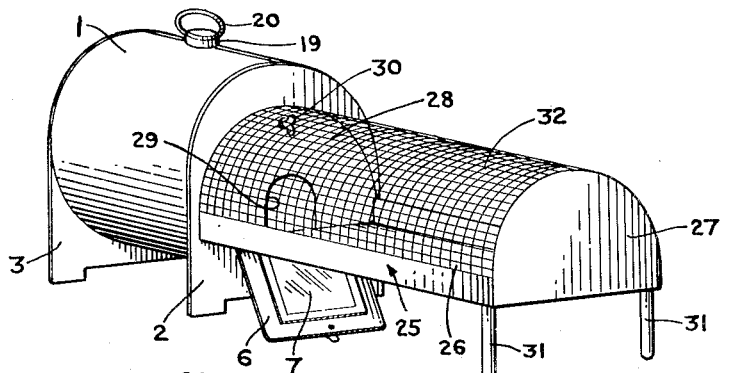
Figure 1 is a perspective view of the improved apparatus for artificial development of germ organisms.

Referring more particularly to the drawings, the improved apparatus for artificial development of germ organisms includes a substantial cylindrical body 1 which is preferably formed by sheet metal and has its two ends closed by front and back pieces 2 and 3. The front and back pieces have their upper edges curved to conform to the curvature of the cylindrical shell 1 and their lower portions extend below the lowermost portion of the shell 1 and are cut square as clearly shown in Figures 1 and 2 of the drawings to form supporting legs for the apparatus.

The cylindrical shell 1 is lined with a lining 4 of light colored heat insulating material such as a sheet of asbestos and the front 2 is provided with an opening 5 therein which is normally closed by a door 6. The door 6 has a transparent panel or window 7 therein through which the interior of the shell 1 may be viewed.

A supporting plate 8 is attached to the front 2 and extends longitudinally into the shell 1 forming a support for a removable tray 9. While in Figure 3 of the drawings the supporting plate 8 is shown as terminating short of the inner sides of the shell 1, it may be of sufficient width to engage the inner surface of the lining 4 if it is so desired, without departing from the spirit of the present invention.

The lower end of the supporting plate 8 is bent upwardly to provide a guard plate 10 for the thermo-switch structure 11. The thermo-switch structure 11 may be of any type of adjustable thermo-switch which may be purchased upon the open market and which is adjustable so that the temperature degree at which the switch mechanism is operated may be predetermined as desired.

The thermo-switch structure 11 controls the energizing and deenergizing of electric light bulbs 12. In the drawings two electric light bulbs 12 are shown but it is to be understood that one or more bulbs may be employed depending upon the size of the apparatus and the degrees of heat desired. The light bulbs 12 are removably carried by the usual form of sockets 13 and the sockets 13 are, in turn, supported by a block 14 of wood or other suitable material. The block 14 serves not only to support the sockets 13 but to form a spacing member for properly spacing the heat and light deflecting plates 15 and 16, positioning one below and one above the light bulbs as clearly shown in Figures 2 and 3 of the drawings. The block 14 is drilled to receive a bolt 17 which extends vertically through the block and is threaded into the lower end of a handle carrying nut 18. The nut 18 has an enlarged head 19 thereon which engages against the outer surface of the shell 1. A bail handle 20 is attached to the head 19 and serves as a handle for carrying the apparatus from place to place.

The door 6 is hingedly or detachably carried by the front 2 and is held in closed position by a latch structure 21 so that the door may be opened to place eggs, seeds or the like in the tray 9 and when eggs are placed therein to permit access to the eggs for turning them during the germinating period. When it is desired to germinate seeds in the apparatus the tray 9 is filled with a sufficient quantity of soil, the seeds planted therein, and the tray is supported on the support 8 after which the door 6 is closed and the lights 12 turned on for the purpose of generating heat and light to cause growing of the seeds and to permit their growing to be viewed through the window 7 in the door 6. The thermo-switch 11 is adjusted to maintain the proper heat or temperature within the apparatus so that when the proper desired degree of heat is reached the light bulbs 12 will be de-energized to prevent overheating and when the temperature falls below the predetermined degree the thermo-switch 11 will turn on the light bulbs 12 thus insuring the proper degree of heat within the apparatus at all times.

It is realized that when eggs are hatched or germinated in the device that it would be desirable to provide a runway for the chicks, ducklings or other fowl after they have hatched, and for this purpose a runway generically indicated by 25 is provided. The runway 25 includes a floor or base 26 with semi-circular ends 27 and 28. The end 28 is provided with an opening 29 which registers with the opening 5 in the front 2 of the apparatus and the end 28 is attached to the front 2 of a latch structure 30 of the same type and utilizing the same means as the latch structure 21 which holds the door 6 closed. The base 26 of the runway has a pair of legs 31 attached to their outer end to support the outer end of the runway while the inner end is supported by its attachment 4 to the front 2. If it is so desired a semi-cylindrical screen 32 may be placed over the runway to prevent the chicks from escaping therefrom. When the runway 25 is attached to the apparatus the door 6 is either opened or removed so as to permit the chicks or other baby fowl to enter the runway or apparatus at will.

Figure 2:
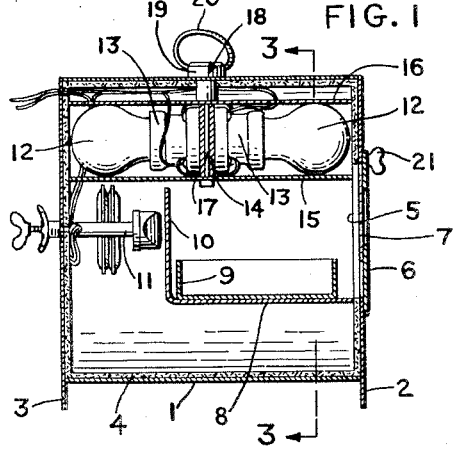
Figure 2 is a longitudinal section through the device taken on the line 2—2 of Figure 3.
Figure 3:
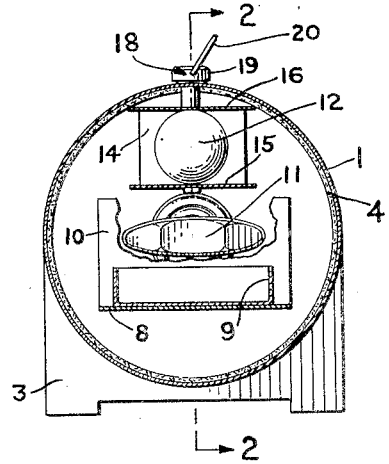
Figure 3 is a cross section through the device taken on the line 3—3 of Figure 2.
Figure 4:
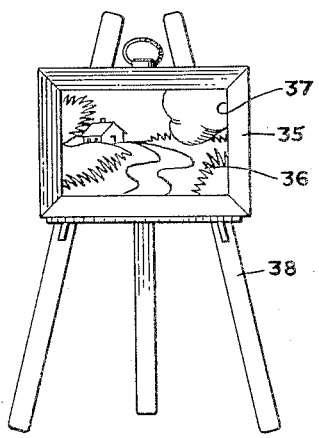
Figure 4 is an elevation of a modified form of the invention.

Figure 4 of the drawings shows generically a modification of the apparatus comprising an apparatus 35 for the artificial development of germ organisms which is constructed like the apparatus shown in Figures 1 to 3 in all respects except that it is rectangular in shape and that the upstanding thermo-switch protecting part of the support plate has a scene painted thereon as shown at 36 which is visible through the window 37 so as to add artisticness to the appearance of the device. This rectangular shaped modified form of the apparatus is shown supported on an easel 38 of any approved construction, but it may of course be supported on any suitable support without departing from the spirit of the present invention.

It will be understood that the invention is not to be limited to the specific construction or arrangement of parts shown, but that they may be widely modified within the invention defined by the claims.

What is claimed is:

1. In an apparatus for artificial development of germ organisms, a housing comprising a cylindrical shell, a front and a back attached to the ends of said shell and projecting below the lowermost part of the shell to form supports for the housing, an L-shaped supporting plate disposed in said cylindrical shell and connected to the front portion of the housing, said front provided with a door opening to provide communication with said L-shaped supporting plate inside the housing, a door for said door opening removably connected to said front portion, a transparent panel in said door to allow the area of said housing enclosed by the supporting plate to be viewed therethrough, a thermo-switch within said housing adjacent the L-shaped supporting plate whereby one arm thereof will form a guard for said thermo-switch, a heating element in said housing above said L-shaped supporting plate to cause germination of germ organisms placed on said support plate in the housing, said heating element being electrically connected to said thermo-switch whereby the same is energized and deenergized by said thermo switch, means operatively associated with said heating elements for supporting said heating elements, heat and light deflector plates disposed in said housing about said heating elements, a handle for carrying said apparatus, and means connecting said handle with said supporting means and said heating elements for holding them in position above said supporting plate.

2. In an apparatus for artificial development of germ organisms as claimed in claim 1 wherein the means operatively associated with said heating elements for supporting said heating elements includes, a plurality of sockets, a mounting member for said sockets, and a threaded member extending through said mounting member to connect the heating elements with the heat and light deflecting means and said handle for mounting them within the housing.

3. In an apparatus for artificial development of germ organisms as claimed in claim 1 wherein the heat and light deflecting elements are mounted in spaced relationship on said means for supporting the heating elements.

4. In an apparatus for artificial development of germ organisms, a housing comprising a cylindrical shell, a front and a back attached to the ends of said shell and projecting below the lowermost part of the shell to form supports for the housing, an L-shaped supporting plate disposed in said cylindrical shell and connected to the front portion of the housing, said front provided with a door opening to provide communication with said L-shaped supporting plate inside the housing, a door for said door opening removably connected to said front portions, a transparent panel in said door to allow the area of said housing enclosed by the supporting plate to be viewed therethrough, a thermo-switch within said housing adjacent the L-shaped supporting plate whereby one arm thereof will form a guard for said thermo-switch, a heating element in said housing above said L-shaped supporting plate to cause germination of germ organisms placed on said support plate in the housing, said heating element being electrically connected to said thermo-switch whereby the same is energized and deenergized by said thermo switch, a carrying support for said heating element, and a carrying handle detachably connected to said housing and said support for holding said heating element in position within the housing.

5. In an apparatus for artificial development of germ organisms as claimed in claim 4 wherein a heat distributing plate is carried by said heating element support.

EMIL A. BRAUN.

REFERENCES CITED

The following references are of record in the file of this patent:

UNITED STATES PATENTS

| Number | Name | Date |
|---|---|---|
| 614,493 | Newsom | Nov. 22, 1898 |
| 931,142 | Perkins et al. | Aug. 17, 1909 |
| 1,316,949 | Hall | Sept. 23, 1919 |
| 1,319,342 | Johnston | Oct. 21, 1919 |
| 1,345,593 | Giddens | July 6, 1920 |
| 1,533,574 | Spratling | Apr. 14, 1925 |
| 1,727,264 | Young | Sept. 3, 1929 |
| 2,002,380 | Wernicke et al | May 21, 1935 |
| 2,300,776 | Collins | Nov. 3, 1942 |

FOREIGN PATENTS

| Number | Country | Date |
|---|---|---|
| 507,081 | France | June 12, 1920 |